United States Patent
Catangiu (10) Patent No.: US 10,228,976 B2
(45) Date of Patent: Mar. 12, 2019

(54) METHODS, SYSTEMS, AND COMPUTER READABLE MEDIA FOR BALANCING INCOMING CONNECTIONS ACROSS MULTIPLE CORES

(75) Inventor: Adrian-Costin Catangiu, Bucharest (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 286 days.

(21) Appl. No.: 13/461,762

(22) Filed: May 1, 2012

(65) Prior Publication Data

US 2013/0297806 A1 Nov. 7, 2013

(51) Int. Cl.
*G06F 9/50* (2006.01)
*H04L 29/08* (2006.01)

(52) U.S. Cl.
CPC .......... *G06F 9/505* (2013.01); *H04L 67/325* (2013.01)

(58) Field of Classification Search
USPC .......... 709/226–228; 711/1–5; 719/311–312, 719/318
See application file for complete search history.

(56) References Cited

U.S. PATENT DOCUMENTS

| | | | | |
|---|---|---|---|---|
| 5,179,702 A * | 1/1993 | Spix | .......... | G06F 8/41 |
| | | | | 711/E12.006 |
| 5,867,706 A * | 2/1999 | Martin | .......... | G06F 9/505 |
| | | | | 709/226 |
| 8,171,385 B1 * | 5/2012 | Tormasov | .......... | 714/805 |
| 8,244,864 B1 * | 8/2012 | Bahl et al. | .......... | 709/225 |
| 8,756,307 B1 * | 6/2014 | Chen | .......... | G06F 11/3414 |
| | | | | 709/223 |
| 2001/0029548 A1 * | 10/2001 | Srikantan et al. | .......... | 709/250 |
| 2002/0133593 A1 * | 9/2002 | Johnson | .......... | G06Q 10/10 |
| | | | | 709/226 |
| 2003/0163589 A1 * | 8/2003 | Bunce | .......... | H04L 49/1546 |
| | | | | 709/250 |
| 2003/0182423 A1 * | 9/2003 | Shafir et al. | .......... | 709/225 |
| 2003/0193955 A1 * | 10/2003 | Beshai | .......... | 370/395.4 |

(Continued)

OTHER PUBLICATIONS

"IxLoad: Specifications," http://www.ixiacom.com/products/ixload/specifications/index.php, pp. 1-7 (Jan. 10, 2012) (Downloaded from the Internet Mar. 20, 2014).

(Continued)

*Primary Examiner* — Joseph E Avellino
*Assistant Examiner* — Tsung Y Wu (57) ABSTRACT

Methods, systems, and computer readable media for balancing incoming connections across multiple cores are disclosed. According to one method, the method occurs at a first processor of a multi-core connection server. The first processor is one of multiple processors of the multi-core connection server configured to receive notification of incoming connection requests associated with a socket and to request the connection requests from a queue. The method includes accepting a first connection request from a queue. The method also includes determining whether a connection quota has been reached. The method further includes in response to determining that the connection quota has been reached, performing an appropriate action based on state information associated with other processors.

18 Claims, 5 Drawing Sheets

(56) References Cited

U.S. PATENT DOCUMENTS

| | | | |
|---|---|---|---|
| 2008/0114895 A1* | 5/2008 | Chun | 709/238 |
| 2009/0157817 A1* | 6/2009 | Williamson | 709/206 |
| 2010/0325268 A1* | 12/2010 | Muthiah et al. | 709/224 |
| 2010/0325429 A1* | 12/2010 | Saha et al. | 713/158 |
| 2011/0149737 A1* | 6/2011 | Muthiah et al. | 370/235 |
| 2013/0208621 A1* | 8/2013 | Manghirmalani et al. | 370/254 |

OTHER PUBLICATIONS

"IxLoad: MS IPTV," http://www.ixiacom.com/products/display?skey=ixload_iptv_and_video, pp. 1-3 (Oct. 14, 2011) (Downloaded from the Internet Mar. 20, 2014).

"IxLoad: IPTV and Video," http://www.ixiacom.com/products/display?skey=ixload_ms_iptv, pp. 1-3 (Dec. 29, 2011) (Downloaded from the Internet Mar. 20, 2014).

* cited by examiner

METHODS, SYSTEMS, AND COMPUTER READABLE MEDIA FOR BALANCING INCOMING CONNECTIONS ACROSS MULTIPLE CORES

TECHNICAL FIELD

The subject matter described herein relates to mobile network equipment testing. More specifically, the subject matter relates to methods, systems, and computer readable media for balancing incoming connections across multiple cores.

BACKGROUND

Server-client applications, such as an Internet protocol television (IPTV) environment, usually rely on a server listening on one or more predefined ports for incoming connection requests. Generally, when testing an IPTV environment, it may be useful to simulate an IPTV server that can receive numerous connection requests and respond accordingly.

Some IPTV servers may use multiple interfaces and/or multiple IP addresses. To reduce the complexity involved for handling requests received via various simulated interfaces and/or addresses, an IPTV server simulator may be configured to receive all incoming connection requests via one network socket or logical endpoint. The socket may be registered to an event notification service so that whenever a new incoming connection request is received on the socket an event is generated. In response to the event, an IPTV server simulator or process therein may accept the new incoming connection request, e.g., using an accept function available in a Linux operating system. Using the connection request, a corresponding connection may be established between the simulator and the client.

While this setup works well for single-core (i.e., single processor) implementations, problems can arise with multi-core implementations. For example, in a multi-core implementation, each core may have a server process that is listening for events associated with the same socket. As such, all listening server processes may be notified of new connection requests and may all try to accept the connection requests. Because each server process may try to accept all incoming connection requests, distribution of connections across the cores may be random and unbalanced. As such, instead of each core handling the same number of connections, some cores may handle significantly more connections and other processors may handle significantly less connections which results in inefficient resource utilization.

Accordingly, in light of these difficulties, a need exists for improved methods, systems, and computer readable media for balancing incoming connections across multiple cores.

SUMMARY

Methods, systems, and computer readable media for balancing incoming connections across multiple cores are disclosed. According to one method, the method occurs at a first processor of a multi-core connection server. The first processor is one of multiple processors of the multi-core connection server configured to receive notification of incoming connection requests associated with a socket and to request the connection requests from a queue. The method includes accepting a first connection request from a queue. The method also includes determining whether a connection quota has been reached. The method further includes in response to determining that the connection quota has been reached, performing an appropriate action based on state information associated with other processors.

According to one system for balancing incoming connections, the system includes a multi-core connection server containing multiple processors. The multiple processors are configured to receive notification of incoming connection requests associated with a socket and to request the connection requests from a queue. A processor of the multi-core connection server is further configured to accept a first connection request from a queue, to determine whether a connection quota has been reached and in response to determining that the connection quota has been reached, performing an appropriate action based on state information associated with other processors.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the term "core" refers to a processor, e.g., a circuit, a central processing unit (CPU), or a graphics processing unit (GPU).

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for balancing incoming connections across multiple cores. When testing IPTV networks and/or other communications networks, it may be desirable to test the response of the network and other equipment under non-trivial load conditions. During simulation and/or testing of nodes associated with connection requests, a multi-core connection server may receive numerous connection requests via a socket or listening port. To prevent a core or processor from accepting or handling more connections than its share, the processor may execute an algorithm that ignores or rejects incoming connection requests after reaching its connection quota.

Advantageously, aspects of the present subject matter herein is directed to an algorithm that roughly balances incoming connection requests across multiple processors by allowing a processor to handle up to its share of connections, but prevents the processor from accepting more than its share of connections. Moreover, the algorithm is fast and efficient because overhead associated with the algorithm is small and the algorithm does not require performing hard synchronization or implementing blocking mechanisms.

Figure 1:
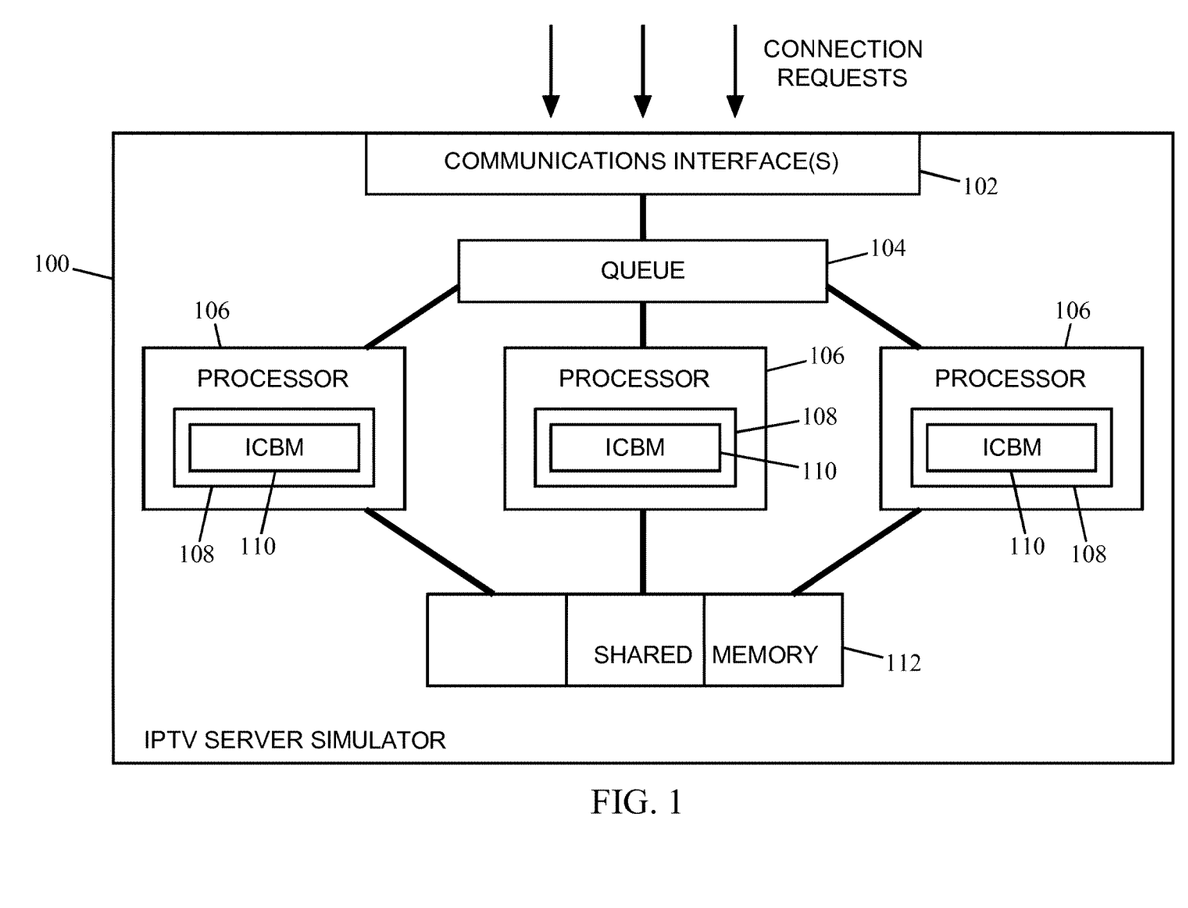
FIG. 1 is a diagram illustrating an IPTV server simulator according to an embodiment of the subject matter described herein.

FIG. 1 is a diagram illustrating an IPTV server simulator 100 according to an embodiment of the subject matter described herein. IPTV server simulator 100 may be any suitable entity for receiving, processing, and/or generating various messages, including connection requests. For example, IPTV server simulator 100 may include a multi-core server or module, where one or more cores are configured to receive, process, and/or generate various messages. In this example, each core may be an independent processor, such as a CPU or GPU, capable of reading and executing computer executable instructions or software. Exemplary messages received, processed, or generated by IPTV server simulator 100 may include real time streaming protocol (RTSP) messages, real time protocol (RTP) messages, real time control protocol (RTCP) messages, user datagram protocol (UDP) messages, transport control protocol (TCP) messages, IP messages, and/or other messages. While FIG. 1 is directed to an IPTV server simulator, it will be appreciated that aspects of the subject matter described herein may be usable for balancing any messages or workload across any multi-core environment.

Referring to FIG. 1, IPTV server simulation 100 may include a communications interface(s) 102, a queue 104, multiple cores or processors 106, and a shared memory 112. Communications interface(s) 102 may represent any suitable entity for communicating with one or more nodes, e.g., for receiving RTSP setup requests. In some embodiments, communications interface(s) 102 may be associated with one or more interfaces and/or one or more IP addresses. For example, communications interface(s) 102 may be configured to receive RTSP messages destined for two or more different IP address and/or from different networks. After receiving a message, communications interface(s) 102 may send them to one or more modules or nodes for processing or may store them in a buffer or queue 104.

Queue 104 may represent any suitable entity for storing messages. For example, queue 104 may be a data structure implemented in a non-transitory computer readable medium, such as shared random access memory (SRAM) or flash memory. Queue 104 may be used for temporarily storing incoming connection requests. In some embodiments, messages may be retrieved in a first in first out (FIFO) order (e.g., the order in which the messages are inserted into queue 104). For example, performing a dequeue operation on queue 104 may remove or retrieve the message that has been in the queue for the longest amount of time. In some embodiments, messages may be retrieved based on other factors or considerations.

Processors 106 may include internal memories 108 and incoming connections balancing modules (ICBMs) 110. Processors 106 may include any suitable entity for performing one or more operations. For example, processor may execute software or other logic to perform various actions. As used herein, the term "processor" may also be used interchangeable with a process or instructions executing on a processor.

Memories 108 may be suitable entities (e.g., flash memory or SRAM) for storing computer executable instructions or logic. Each memory 108 may include or be part of an ICBM 110. ICBMs 110 may include software for controlling processors 106 and/or for performing one or more aspects of the subject matter described herein. For example, ICBMs 110 may include algorithms and/or other processing logic for balancing a workload (e.g., connections) across processors 106. In some embodiments, ICBMs 110 may include software or computer executable instructions usable for determining whether an incoming connection request should be accepted, rejected, and ignored. For example, each ICBM 110 may include a balancing algorithm that allows a processor to handle up to a certain amount of connections. After reaching the certain amount or connection quota, the balancing algorithm may require a processor to ignore or reject other incoming connections depending on various conditions or scenarios.

Shared memory 112 may be any suitable entity for storing data. For example, each processor 106 may write or store state information in a particular region or portion of shared memory 112. In some embodiments, a processor 106 may read any portion of shared memory 112, including state information associated with other processors 106. Stored state information may be used (e.g., by processes executing on processors 106) to determine whether incoming connection requests should be accepted, ignored, or rejected. For example, state information associated with each processor 106 may include a state identifier, a connection quota, and a number of current active connections and may be represented by values stored in shared memory 112. For example, each process or processor 106 may be associated with an accept state, an ignore state, and a reject state. The state identifier may be a value or other indicator (e.g., a flag bit) that identifies which state is currently associated with a process or processor 106.

In some embodiments, some state information associated with each processor 106 (e.g., a connection quota and a number of current connections) may be stored in a different and/or distinct memory (e.g., a processor or local memory 108).

In some embodiments, shared memory 112 and queue 104 may be integrated or co-located. In some embodiments, shared memory 112 and queue 104 may include separate and distinct entities (e.g., each using a different computer readable medium).

Figure 2:
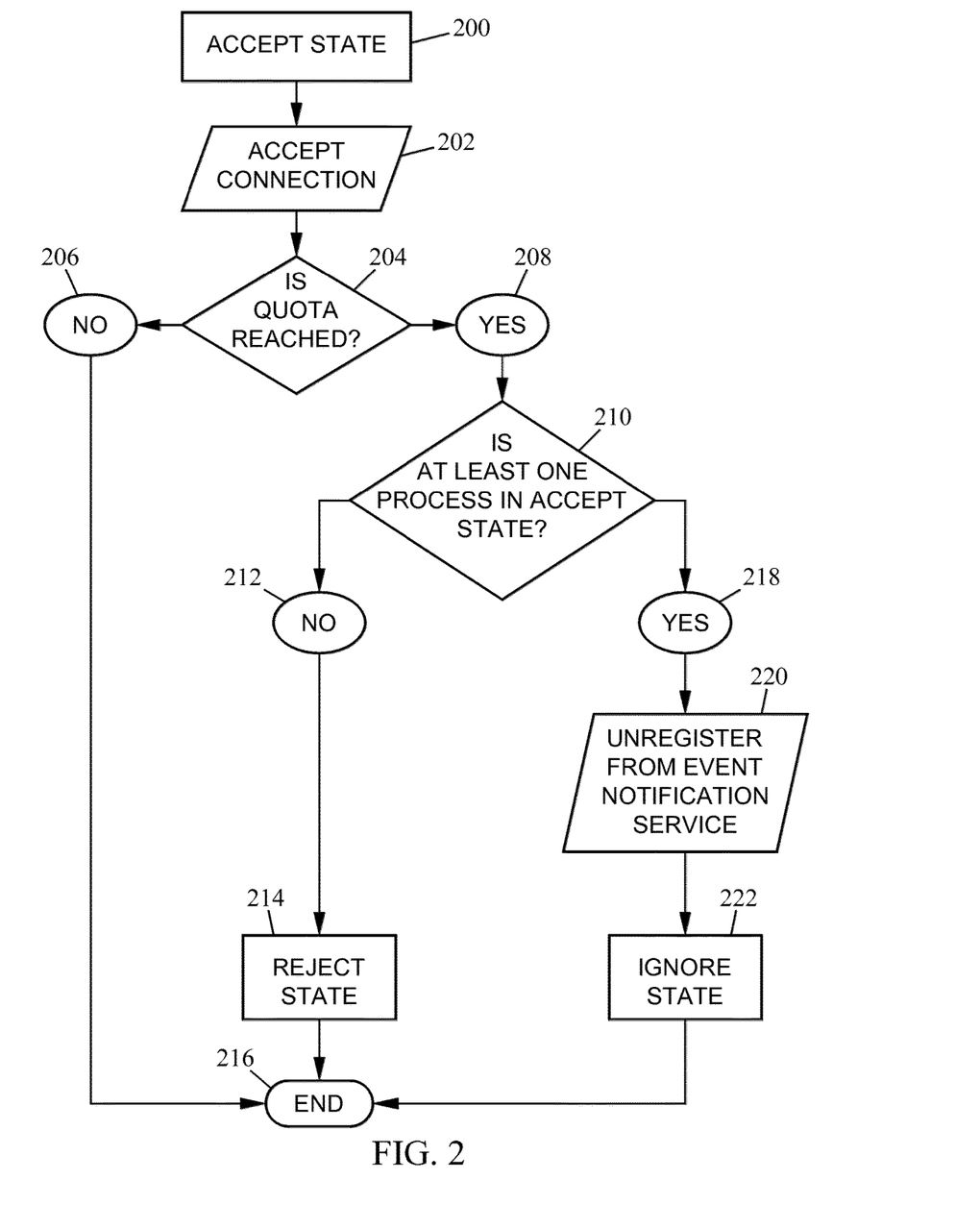
FIG. 2 is diagram illustrating processing logic associated with accepting a connection request according to an embodiment of the subject matter described herein.

FIG. 2 is diagram illustrating processing logic associated with accepting a connection request according to an embodiment of the subject matter described herein. In some embodiments, processing logic depicted in FIG. 2 may be used, executed, or associated with one or more processors 106 and/or one or more server processes (e.g., ICBMs 110) executing on processors 106. For example, each processor 106 may execute an ICBM 110 that includes processing logic described herein.

At step 200, a server process is associated with an accept state. A server process associated with an accept state may be capable of accepting at least one connection request and setting up an associated connection between IPTV server simulator 100 and the requesting entity, e.g., a client. Prior to, concurrent with, or in response to entering (or becoming associated with) an accept state, a server process may update a state identifier, e.g., in shared memory 112, to indicate an accept state. A server process may also be associated with a connection quota which may be indicated by a value (e.g., 100) stored in shared memory 112 or local memory 108.

In some embodiments, a connection request may be sent from a client to IPTV server simulator 100. For example, an RTSP setup request or other message may be sent to a listening port (e.g., port 554) at IPTV server simulator 100. Depending on network conditions and other factors, the request may be stored in queue 104 until a server process (e.g., ICBM 110) obtains the connection request.

In some embodiments, an event notification service (ENS) associated with a listening port or socket at IPTV server simulator 100 may notify one or more server processes executing on one or more processors 106 about an incoming connection request and/or other events. For example, ICBMs 110 may register with an ENS for receiving notifications of incoming connection requests. In response to receiving a notification, a first ICBM 110 executing on a first processor 106 may perform one or more actions (e.g., pre-connection setup) for setting up a new connection. For example, a server process may allocate various resources for providing a connection. After performing such actions, the server process may attempt to obtain a connection request stored in queue 104.

At step 202, in response to being notified of an incoming connection request (e.g., by an ENS), a server process may accept a connection. For example, ICBM 110 may initiate or invoke an accept function. The accept function may retrieve or obtain a connection request from queue 104. After obtaining the connection request, a new connection (e.g., between server and client) may be setup using information (e.g., a destination port and IP address) in the request.

In some embodiments, a server process may invoke an accept function multiple times, e.g., in quick succession. For example, when a first connection request is received, all server processes (e.g., ICBMs 110) associated with an active state may be notified concurrently about the first connection request. Prior to invoking an accept function to obtain the first connection request, each process may perform various pre-connection actions for facilitating setup of a new connection. After performing this pre-connection setup, each process may invoke an accept function to obtain the first connection request. In this example, in response to the accept function being invoked by multiple processes, only one server process may obtain the first connection request while the other server process may return nothing. To avoid squandering resources, including time, associated with pre-connection setup, it may be beneficial for each server process to invoke an accept function multiple times or until a connection request is obtained, thereby ensuring that each server process obtains a connection request (provided there are some requests available in queue 104). As such, by invoking an accept function one or more times for each process, resources associated with pre-connection setup are not wasted or underutilized.

At step 204, a server process may determine whether a connection quota is reached. For example, after accepting a connection request and/or setting up an associated connection, a first ICBM 110 executing on a first processor 106 may increment a current active connections value indicating the amount of connections currently being handled at processor 106. The first ICBM 110 may compare the current active connection value and a connection quota to determine whether the values are equal.

In some embodiments, where a total number of concurrent connections available for a platform (e.g., IPTV server simulator 100) is known or predetermined, each ICBM 110 may be assigned a connection quota based on the total number of concurrent connections available and a total number of processors, e.g., 1200 (total number of connections available)/12 (total number of processors)=100 (connection quota for each processor).

In some embodiments, where a total number of concurrent connections available for a platform is unknown (e.g., where a protocol and/or application being utilized makes computing the bandwidth or resource usage associated with each connection difficult to accurately estimate beforehand), each ICBM 110 may be assigned a temporary connection quota and may be stored in shared memory 112. In such embodiments, a temporary connection quota may increase or decrease based on certain factors, such as resources available. For example, each ICBM 110 may accept connections up to its temporary connection quota.

In some embodiments, after reaching its quota, a server process may determine whether it is the last process to reach its quota and if so, the server process may initiate increasing all connection quotas (e.g., multiplying the current connection quota by 2). For example, a first ICBM 110 executing on a first processor 106 may change a connection quota value in its portion of shared memory 112. Other ICBMs 110 executing on other processors 106 may check state information associated with the first ICBM 110 and determine that the first ICBM 110 is associated with a higher connection quota. In response, the other ICBMs 110 may increase their connection quotas to match the connection quota associated with the first ICBM 110. In another example, a first ICBM 110 may send an increase connection quota message that includes a new connection quota. In response to receiving the message, other ICBMs 110 may change their connection quotas to the new connection quota.

At step 206, a server process may determine that the connection quota is not reached and may proceed to step 216. At step 216, the processing logic may end or may loop starting at step 202. For example, after accepting a first connection and determining its connection quota is not reached, a first ICBM 110 executing on a first processor 106 may accept a second connection request.

At step 208, a server process may determine that the connection quota is reached and may proceed to step 210.

At step 210, a server process may determine whether at least one server process (executing on other processors 106) is associated with an accept state (e.g., has not exceeded its connection quota and is capable of accepting a connection request). For example, a first ICBM 110 executing on a first processor 106 may check shared memory 112 for state identifiers associated with other ICBMs 110. In this example, if at least one state identifier indicates a server process associated with an accept state, the first ICBM 110 may ignore additional connection requests until certain conditions are met. If no state identifiers indicate a server process associated with an accept state, the first ICBM 110 may reject additional connection requests until certain conditions are met, e.g., until its connection quota is no longer reached.

At step 212, a server process may determine that no server processes are associated with an accept state and may proceed to step 214.

At step 214, a server process may enter a reject state and proceed to step 216. For example, a first ICBM 110 executing on a first processor 106 may change a state identifier stored in shared memory 112 to indicate a reject state. At step 216, the processing logic may end or may handle (e.g., reject) a second connection request as described with regard to FIG. 3.

At step 218, a server process may determine that at least one server process (e.g., executing at the other processors 106) is associated with an accept state and may proceed to step 220.

At step 220, a server process may unregister from an ENS. For example, a first ICBM 110 executing on a first processor 106 may send an unregister message to an ENS associated with a listening port (e.g., RTSP port 554) or socket at IPTV server simulator 100. The ENS may be responsible for notifying ICBMs 110 of an incoming connection request. By unregistering from the ENS, the first ICBM 110 may not receive notification of such events. As such, the first ICBM 110 may not attempt to accept any new connections.

In some embodiments, after a server process reaches its connection quota and determines that at least one server process is associated with an accept state, the server process may ignore notifications from the ENS without unregistering from the ENS. For example, a first ICBM 110 executing on a first processor 106 may ignore received notifications and allow other processes to accept connection requests until certain conditions are met, e.g., until its connection quota is no longer reached.

At step 222, a server process may enter an ignore state and proceed to step 216. For example, a first ICBM 110 executing on a first processor 106 may change a state identifier stored in shared memory 112 to indicate an ignore state. At step 216, the processing logic may end or may ignore one or more connections requests until certain conditions are met.

Figure 3:
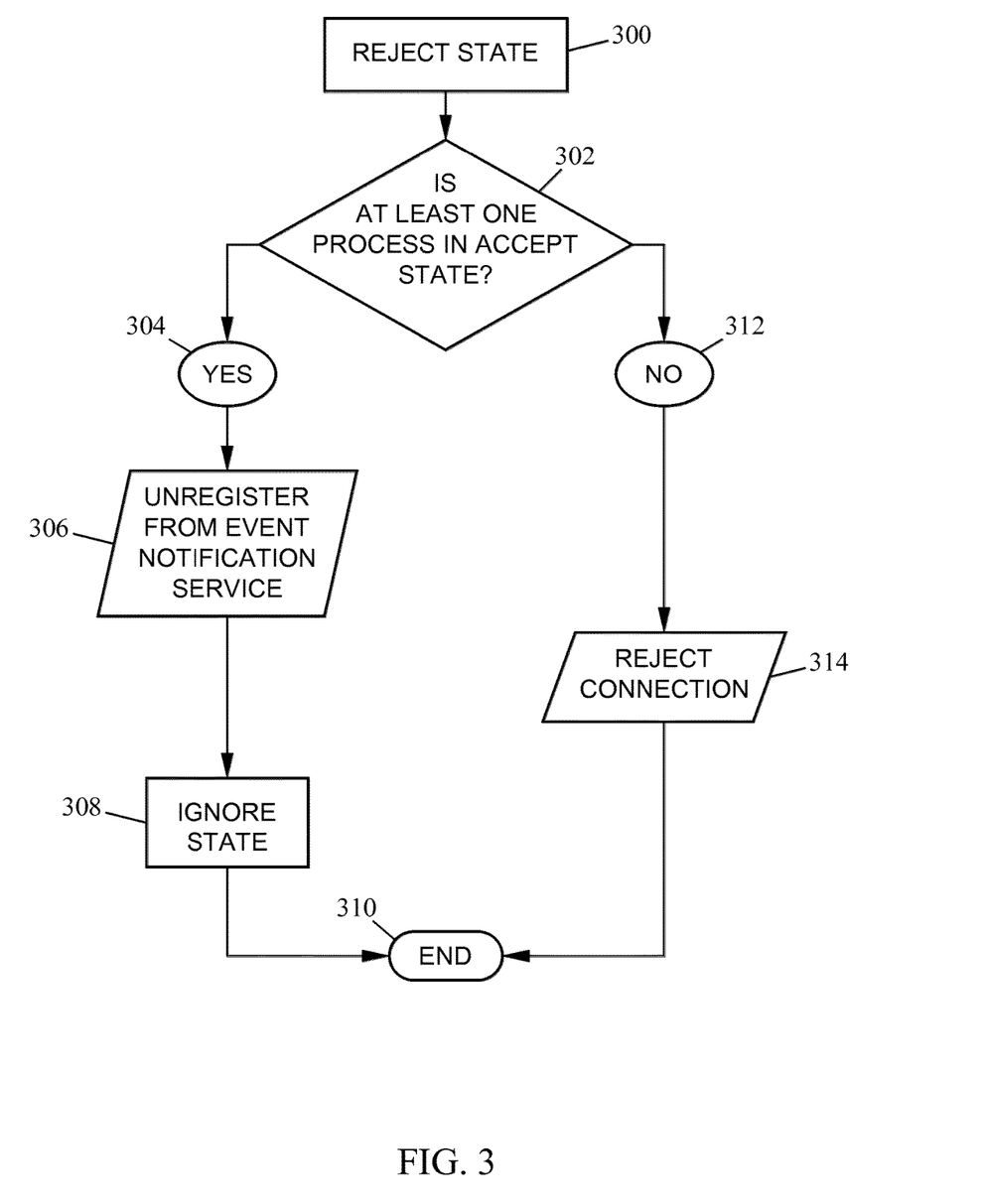
FIG. 3 is diagram illustrating processing logic associated with rejecting a connection request according to an embodiment of the subject matter described herein.

FIG. 3 is diagram illustrating processing logic associated with rejecting a connection request according to an embodiment of the subject matter described herein. In some embodiments, processing logic depicted in FIG. 3 may be used, executed, or associated with one or more processors 106 and/or one or more server processes (e.g., ICBMs 110) executing on processors 106. For example, each processor 106 may execute an ICBM 110 that includes processing logic described herein.

At step 300, a server process is associated with a reject state. A server process associated with a reject state may reject a connection request, e.g., by sending an appropriate response message, such as an "insufficient bandwidth" message, to the requesting entity. Prior to, concurrent with, or in response to entering (or becoming associated with) a reject state, a server process may update a state identifier, e.g., in shared memory 112, to indicate a reject state.

In some embodiments, one server process of a plurality of server processes may be associated with a reject state. For example, the last server process to reach its connection quota may be associated with a reject state. In this example, other server processes that have reached their connection quota may be associated with an ignore state and, as such, may not accept or reject connection requests. In some embodiments, two or more server processes (e.g., the last two server processes to reach their connection quotas) may be associated with a reject state.

In some embodiments, a server process associated with a reject state may determine whether other server processes (i.e., other processors 106) can accept a connection request before rejecting the connection request. If a second server process can handle the connection request, the server process associated with the reject state may enter an ignore state and allow the second server process to accept the connection request and setup the associated connection. If no processes can handle the connection request, the server process associated with the reject state may reject the connection request, e.g., by sending an "insufficient bandwidth" message to the requesting entity.

At step 302, in response to being notified of an incoming connection request (e.g., by an ENS), a server process may determine whether at least one server process (executing on other processors 106) is in an accept state (e.g., has not exceeded its connection quota).

At step 304, a server process may determine that at least one server process (e.g., executing at the other processors 106) is associated with an accept state and may proceed to step 306.

At step 306, a server process may unregister from an ENS. As such, the server process may not accept or reject any new connections, but may wait for certain conditions to be met (e.g., a connection quota to be increased or a current connection to be closed) before entering a new state and/or re-registering with the ENS.

In some embodiments, after a server process reaches its connection quota and determines that at least one server process is associated with an accept state, the server process may ignore notifications from the ENS without unregistering from the ENS.

At step 308, a server process may enter an ignore state and proceed to step 310. For example, a first ICBM 110 executing on a first processor 106 may change a state identifier stored in shared memory 112 to indicate an ignore state. At step 310, the processing logic may end or may ignore connections requests until certain conditions are met.

Figure 4:
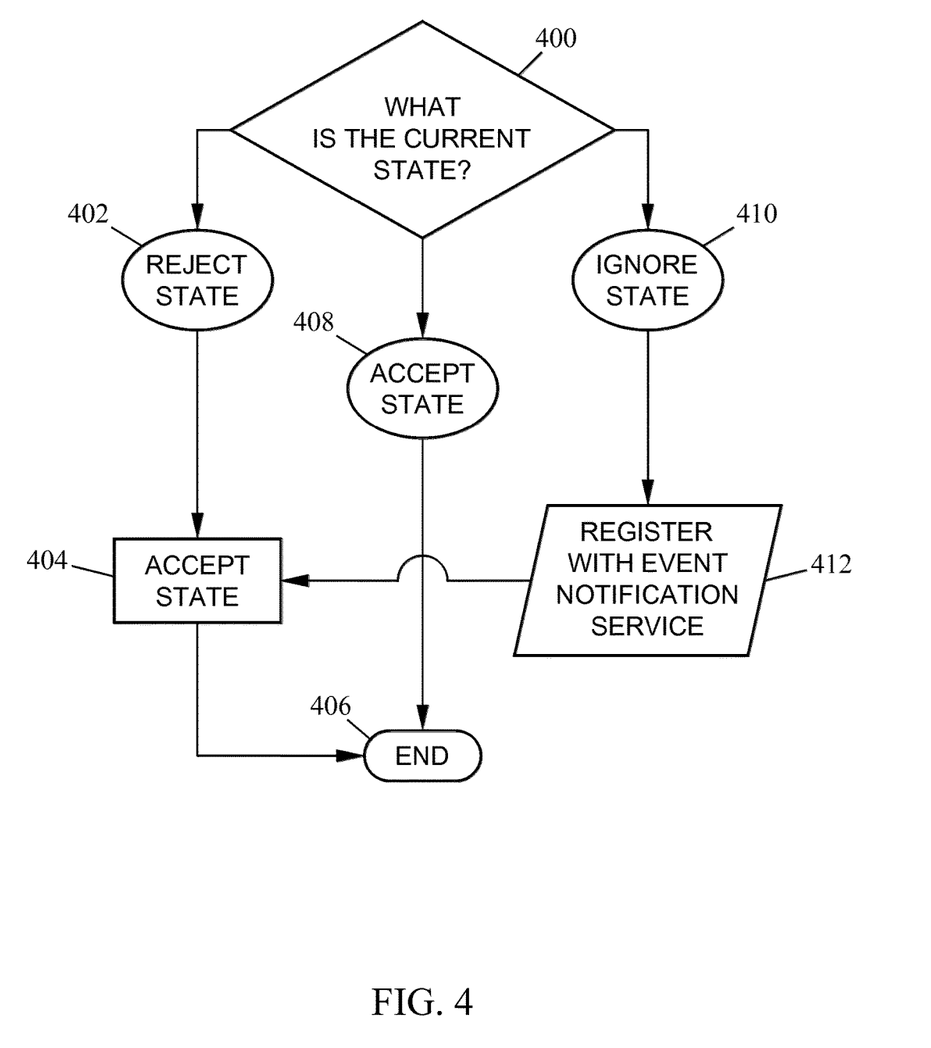
FIG. 4 is diagram illustrating processing logic associated with closing a connection according to an embodiment of the subject matter described herein.

In some embodiments, unregistering from an ENS, ignoring notifications, and/or entering an ignore state may be concurrent actions or may occur in a different order than depicted in FIGS. 3 and 4.

At step 312, a server process may determine that no server processes are associated with an accept state and may proceed to step 314.

At step 314, a server process may reject a connection request and proceed to step 310. For example, a first ICBM 110 executing on a first processor 106 may obtain a connection request from queue 104. However, instead of setting up a connection between IPTV server simulator 100 and a requesting entity, the first ICBM 110 may send a rejection message indicating that a connection cannot be established at this time. At step 310, the processing logic may end or may continue at step 302 for a second connection request.

FIG. 4 is diagram illustrating processing logic associated with closing a connection according to an embodiment of the subject matter described herein. In some embodiments, processing logic depicted in FIG. 4 may be used, executed, or associated with one or more processors 106 and/or one or more server processes (e.g., ICBMs 110) executing on processors 106. For example, each processor 106 may execute an ICBM 110 that includes processing logic described herein.

In some embodiment, a server process may perform various actions when a connection is closed, terminated, or ended. For example, a first processor 106 may handle one hundred connections concurrently. In this example, one of the connections may end, e.g., a client or IPTV server simulator 100 may terminate the connection. In response, a first ICBM 110 executing on the first processor 106 may perform various actions, such as updating its state identifier to indicate a new state and/or register with an ENS.

At step 400, in response to a connection being closed or terminated, a server process may determine what state (e.g., reject state, accept state, or ignore state) is associated with the server process. For example, in response to a connection being closed or terminated, a first ICBM 110 executing on a first processor 106 may decrement a current active connections value indicating the amount of connections currently being handled at processor 106. After decrementing the current active connections value, the first ICBM 110 may check shared memory 112 or memory 108 for an associated state identifier. Depending on the state identified, the first ICBM 110 may proceed to step 402, 408, or 410.

In step 402, a server process may determine that it is associated with a reject state and may proceed to step 404. For example, prior to a connection being terminated, a first ICBM 110 executing on a first processor 106 may be associated with a reject state indicating that a connection quota is currently met. In this example, after the connection is terminated, the number of connections currently being handled may be less than the connection quota and, as such, the server process may enter an accept state.

In step 404, a server process may enter an accept state and proceed to step 406. For example, a first ICBM 110 executing on a first processor 106 may change a state identifier stored in shared memory 112 to indicate an accept state. At step 406, the processing logic may end or may handle a second connection request as described with regard to FIG. 2.

In step 408, a server process may determine that it is associated with an accept state and may proceed to step 406. For example, prior to a connection being terminated, a first ICBM 110 executing on a first processor 106 may be associated with an accept state indicating that a connection quota is not currently met. In this example, after the connection is terminated, the number of connections currently being handled may still be less than the connection quota and, as such, the server process may continue to be associated with an accept state. At step 406, the processing logic may end or may handle a second connection request as described with regard to FIG. 2.

In step 410, a server process may determine that it is associated with an ignore state and may proceed to step 412. For example, prior to a connection being terminated, a first ICBM 110 executing on a first processor 106 may be associated with an ignore state indicating that a connection quota is currently met. In this example, after the connection is terminated, the number of connections currently being handled may be less than the connection quota and, as such, the server process may register with an ENS and enter an accept state.

In step 412, a server process may register with an ENS and may proceed to step 404 and then to step 406. For example, a first ICBM 110 executing on a first processor may send a registration message to an ENS associated with a listening port (e.g., RTSP port 554) or socket associated with IPTV server simulator 100. By registering with the ENS, the first ICBM 110 may receive notifications of incoming connections request and/or other events. In step 404, a server process may enter an accept state and proceed to step 406. At step 406, the processing logic may end or may handle a second connection request as described with regard to FIG. 2.

In some embodiments where a server process associated with an ignore state does not unregister from an ENS, the server process may heed or otherwise act on notifications from the ENS in response to or in preparation of entering an accept state.

In some embodiments, registering with an ENS, heeding notifications, and/or entering an accept state may be concurrent actions or may occur in a different order than depicted in FIG. 4.

Figure 5:
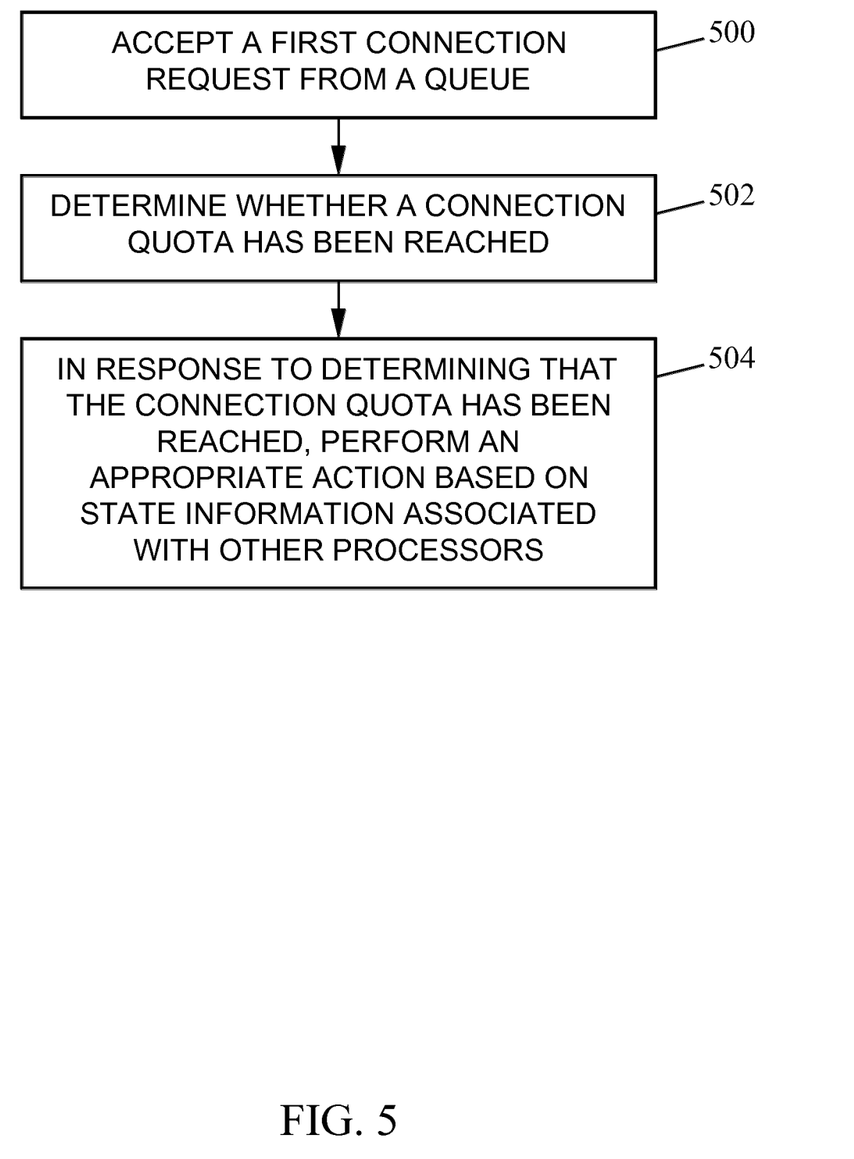
FIG. 5 is a diagram illustrating an exemplary process for balancing incoming connections according to an embodiment of the subject matter described herein.

FIG. 5 is a diagram illustrating an exemplary process for balancing incoming connections according to an embodiment of the subject matter described herein. In some embodiments, the exemplary process described herein, or portions thereof, may be performed by IPTV server simulator 100, an ICBM 110, a processor 106, and/or another node or module. For example, the exemplary process may be performed at or by a first processor in a multi-core connection server. The first processor may be one of multiple processors of the multi-core connection server and each of the multiple processors may be configured to receive notification of incoming connection requests associated with a socket and to request the connection requests from a queue.

In step 500, a first connection request may be received from a queue. For example, a first ICBM 110 executing on a first processor 106 may invoke an accept function one or more times until a first connection request is obtained from queue 104. In some embodiments, queue 104 may include multiple connection requests received via one or more listening ports and/or associated with a socket or logical endpoint.

In step 502, it may be determined whether a connection quota has been reached. For example, a first ICBM 110 executing on a first processor 106 may check a value stored in shared memory 112 or memory 108. The value may indicate a limit of total number of concurrent connections that may be handled by the first processor 106.

In step 504, in response to determining that the connection quota has been reached, an appropriate action based on state information associated with other processors may be performed. For example, a first ICBM 110 executing on a first processor 106 may check shared memory 112 for state information associated with the other processors. Depending on the state information associated with other processors (e.g., whether a second ICBM 110 is associated with an accept state or whether all ICBMs 110 are associated with ignore states), the first ICBM 110 may ignore or reject the second connection request or may initiate increasing connection quotas for all ICBMs 110.

In some embodiments, performing an appropriate action based on state information associated with other processors includes determining that another processor can accept the second connection request and in response to determining that the other processor can accept the second connection request, ignoring at least the second connection request. For example, by ignoring subsequent connection requests, other processors may accept the subsequent connection requests thereby facilitating a more balanced distribution of connections across the multiple processors.

In some embodiments, ignoring the second connection request includes ignoring at least the second connection request until the connection quota is no longer reached and after determining that the connection quota is no longer reached, accepting a third connection request from the queue.

In some embodiments, ignoring the second connection request includes deregistering from a connection event notification service associated with incoming connection requests or disregarding an event notification associated with the second connection request.

In some embodiments, performing an appropriate action based on state information associated with other processors includes determining that no other processors can accept a second connection request and in response to determining that no other processors can accept the second connection request, initiating increasing connection quotas for the multiple processors of the multi-core server.

For example, in a scenario where a total number of concurrent connections for a platform is unknown or where there is no upper limit on the number of concurrent connections, each server process may be associated with a connection quota or limit. After reaching its quota, a server process may determine whether it is the last process to reach its quota and/or if all other server processes are currently associated with ignore states. If so, the server process may initiate increasing all connection quotas (e.g., multiplying the current connection quota by 2). After connection quotas for all server processes are increased, each server process may accept subsequent connection requests. In this example, incoming connection requests may not be rejected.

In some embodiments, performing an appropriate action based on state information associated with other processors includes determining that no other processors can accept the second connection request and in response to determining that no other processors can accept the second connection request, rejecting at least the second connection request. For example, in a scenario where a total number of concurrent connections for a platform is known, if all processors have reached their connection quota, some new connections request may be rejected (e.g., by the last processor to reach its quota).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for balancing incoming connections, the method comprising:
   at a first processor of a multi-core connection server, wherein the first processor is one of multiple processors of the multi-core connection server, wherein the multiple processors are configured to receive notification of incoming connection requests associated with a socket, wherein a first connection request and a second connection request are stored in a queue shared by the multiple processors of the multi-core connection server, wherein requests in the queue are awaiting processing by any of the multiple processors of the multi-core connection server:
      accepting, by the first processor, the first connection request from the queue;
      after accepting the first connection request, determining, by the first processor, that a connection quota for the first processor has been reached; and
      in response to determining that the connection quota for the first processor has been reached, performing an appropriate action based on state information associated with other processors of the multiple processors, wherein performing an appropriate action based on the state information includes:
         determining whether another processor of the multiple processors can accept the second connection request;
         in response to determining that the another processor can accept the second connection request, ignoring the second connection request and refraining from rejecting the second connection request, wherein the another processor with available processing capacity accepts the second connection request; and
         in response to determining that none of the multiple processors can accept the second connection request, rejecting the second connection request by removing the second connection request from the queue and sending a rejection message to a sender of the second connection request.

2. The method of claim 1 comprising keeping the first processor in a rejection state where incoming connections are rejected until the connection quota for the first processor is no longer reached or until another processor can accept a third connection request from the queue.

3. The method of claim 1 comprising keeping the first processor in an ignore state where incoming connections are ignored but not rejected until the connection quota for the first processor is no longer reached and after determining that the connection quota for the first processor is no longer reached, accepting a third connection request from the queue.

4. The method of claim 1 wherein ignoring the second connection request includes deregistering from a connection event notification service associated with incoming connection requests or disregarding an event notification associated with the second connection request.

5. The method of claim 1 wherein performing the appropriate action based on the state information includes determining that none of the multiple processors can accept the second connection request and in response to determining that none of the multiple processors can accept the second connection request, initiating increasing connection quotas for the multiple processors of the multi-core server.

6. The method of claim 1 wherein accepting the first connection request from a queue includes invoking an accept function one or more times until the first connection request is obtained from the queue or until a predetermined number of invocations of the accept function is performed.

7. The method of claim 1 wherein the queue includes multiple connection requests received via one or more listening ports.

8. The method of claim 1 wherein determining whether the connection quota for the first processor has been reached includes checking a value stored in memory.

9. The method of claim 1 wherein the connection quota for the first processor is based on a predetermined connection limit for the server, a number of processors, a protocol, an application, or a network condition.

10. The method of claim 1 wherein determining whether the another processor can accept the second connection request includes checking a shared memory for the state information associated with the other processors.

11. A system for balancing incoming connections, the system comprising:
   a multi-core connection server containing multiple processors, wherein the multiple processors are configured to receive notification of incoming connection requests associated with a socket, wherein a first connection request and a second connection request are stored in a queue shared by the multiple processors of the multi-core connection server, wherein requests in the queue are awaiting processing by any of the multiple processors of the multi-core connection server, wherein a first processor of the multi-core connection server is configured to accept the first connection request from the queue, after accepting the first connection request, to determine that a connection quota for the first processor has been reached, and in response to determining that the connection quota for the first processor has been reached, to perform an appropriate action based on state information associated with associated with other processors of the multiple processors, wherein the first processor is configured to:

- determine whether another processor of the multiple processors can accept the second connection request;
- reject the second connection request in response to determining that the connection quota for the first processor has been reached and that none of the multiple processors can accept the second connection request, wherein rejecting the second connection request includes removing the second connection request from the queue and sending a rejection message to a sender of the second connection request; and
- ignore the second connection request in response to determining that the connection quota for the first processor has been reached and that the another processor can accept the second connection request instead of sending a rejection message, wherein the another processor with available processing capacity accepts the second connection request.

12. The system of claim 11 wherein the first processor is configured to remain in a rejection state where incoming connections are rejected until the connection quota for the first processor is no longer reached or until another processor can accept a third connection request from the queue.

13. The system of claim 11 wherein the first processor is configured to ignore the second connection request by deregistering from a connection event notification service associated with incoming connection requests or disregarding an event notification associated with the second connection request.

14. The system of claim 11 wherein the first processor is configured to initiate increasing connection quotas for the multiple processors of the multi-core server in response to determining that the connection quota for the first processor has been reached and that none of the multiple processors can accept a second connection request.

15. The system of claim 11 wherein the first processor is configured to accept the first connection request from a queue by invoking an accept function one or more times until the first connection request is obtained from the queue or until a predetermined number of invocations of the accept function is performed.

16. The system of claim 11 wherein the first processor is configured to check a value stored in memory for determining whether the connection quota for the first processor has been reached.

17. The system of claim 11 wherein determining whether the another processor can accept the second connection request includes checking a shared memory for the state information associated with the other processors.

18. A non-transitory computer readable medium comprising computer executable instructions embodied in a computer readable medium that when executed by a processor of a computer control the computer to perform steps comprising:

at a first processor of a multi-core connection server, wherein the first processor is one of multiple processors of the multi-core connection server, wherein the multiple processors are configured to receive notification of incoming connection requests associated with a socket, wherein a first connection request and a second connection request are stored in a queue shared by the multiple processors of the multi-core connection server, wherein requests in the queue are awaiting processing by any of the multiple processors of the multi-core connection server:
- accepting, by the first processor, the first connection request from the queue;
- after accepting the first connection request, determining, by the first processor, that a connection quota for the first processor has been reached; and
- in response to determining that the connection quota for the first processor has been reached, performing an appropriate action based on state information associated with other processors of the multiple processors, wherein performing an appropriate action based on the state information includes:
  - determining whether another processor of the multiple processors can accept the second connection request;
  - in response to determining that the another processor can accept the second connection request, ignoring the second connection request and refraining from rejecting the second connection request, wherein the another processor with available processing capacity accepts the second connection request; and
  - in response to determining that none of the multiple processors can accept the second connection request, rejecting the second connection request by removing the second connection request from the queue and sending a rejection message to a sender of the second connection request.

* * * * *